(12) United States Patent
Klingler

(10) Patent No.: US 6,536,226 B2
(45) Date of Patent: Mar. 25, 2003

(54) EQUALIZING TANK

(75) Inventor: Dietrich Klingler, Heubach (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/995,799

(22) Filed: Nov. 29, 2001

(65) Prior Publication Data
US 2002/0062651 A1 May 30, 2002

(30) Foreign Application Priority Data
Nov. 29, 2000 (DE) .......................................... 100 59 369

(51) Int. Cl.⁷ .............................. F25D 17/02; B60H 1/32
(52) U.S. Cl. .............................. 62/434; 62/244; 62/185; 123/325
(58) Field of Search .......................... 62/434, 185, 430, 62/435, 244, 201; 123/325, 41.21

(56) References Cited

U.S. PATENT DOCUMENTS

| 4,584,971 A | 4/1986 | Neitz et al. ............... 123/41.21 |
| 5,176,112 A | 1/1993 | Sausner et al. .......... 123/41.21 |
| 5,735,133 A | * 4/1998 | Voss et al. ..................... 62/185 |

FOREIGN PATENT DOCUMENTS

| DE | 33 39 717 C2 | 1/1990 |
| DE | 41 02 853 A1 | 8/1992 |

* cited by examiner

Primary Examiner—Chen-Wen Jiang
(74) Attorney, Agent, or Firm—Foley & Lardner

(57) ABSTRACT

An equalizing tank is disclosed comprising a housing, a pressure dissipation orifice, and a return flow line configured to provide fluid communication within the housing without fluid entering the pressure dissipation orifice. Also disclosed is a method of making the equalizing tank and an automotive air-conditioning system including the equalizing tank.

22 Claims, 5 Drawing Sheets

EQUALIZING TANK

CROSS-REFERENCE TO RELATED PATENT APPLICATIONS

This application claims the benefit and priority of related German Patent Application 10059369.0 filed on Nov. 29, 2000, which is incorporated by reference herein in its entirety.

BACKGROUND OF THE INVENTION

A. Field of the Invention

The invention relates to an equalizing tank, in particular, to an equalization tank for use in a cooling-medium circuit of an air-conditioning system of a motor vehicle and having pressure-equalizing means for equalizing an excessive and/or negative pressure.

B. Background of the Invention

Equalizing tanks in fluid circuits of motor vehicles, for example, in an engine cooling circuit, require a pressure relief valve and a suction relief valve in order to not lose any cooling liquid during acceleration or deceleration of the vehicle, and to equalize changes in liquid volume of the engine cooling circuit, for example, due to changes in temperature or due to loss of cooling liquid.

Valves of this type represent a cost factor and generally have to be fitted on the equalizing tank in separate installation steps during production, which is disadvantageous. Thus, a need exists for a valve-free equalization tank that does not lose cooling liquid during acceleration or deceleration, and equalizes changes in liquid volume.

SUMMARY OF THE INVENTION

The present invention is directed to overcoming or at least reducing the effects of one or more of the problems set forth above and other problems in the prior art.

According to one aspect of the invention there has been provided an equalizing tank suitable for use in an automotive air-conditioning system that includes a fluid cooling-medium circuit, comprising: a housing defining a generally closed tank for containing the cooling-medium fluid; a pressure compensation mechanism comprising a pressure dissipation orifice that opens into the housing, wherein the orifice remains open; and structure associated with the housing that prevents the cooling-medium fluid from entering the pressure dissipation orifice during changes in fluid level within the housing.

According to one aspect of the present invention, an equalizing tank is provided comprising a housing, a pressure dissipation orifice, and a return flow line configured to provide fluid communication within the housing without fluid entering the pressure dissipation orifice.

According to another aspect of the present invention, the return flow line is positioned within a receiving depression of the housing.

According to another aspect of the present invention, the housing includes a first end and a second end, wherein the return flow line provides fluid communication between the first end and the second end of the housing.

According to another aspect of the present invention, the housing comprises a plurality of wall-like depressions protruding into the interval volume of the housing, the depressions defining a first, second, and third subvolume within the housing, a first gap providing fluid communication between the first subvolume and the second subvolume, and a second gap providing fluid communication between the second subvolume and the third subvolume.

According to a preferred aspect of the present invention, the equalizing tank further comprises a collection container, wherein the return flow line discharges into the collection container.

According to another aspect of the present invention, the return flow line is an integral part of the collection tank.

According to another preferred aspect of the present invention, the pressure dissipation orifice is positioned above a point at which the return flow line discharges into the collection container.

According to another aspect of the present invention, the equalizing tank further comprises a fluid-level gage.

According to yet another aspect of the present invention, a method of manufacturing an equalizing tank is provided comprising blow-molding a housing, the housing being formed with an opening and a receiving depression; inserting a collection container into the housing opening, the collection container including a pressure dissipation orifice; and inserting a return flow line into the receiving depression, wherein the return flow line provides fluid communication with the collection container and within the housing in a manner such that fluid does not enter the pressure dissipation orifice during changes in fluid level in the housing.

According to another aspect of the present invention, the method of manufacturing an equalizing tank further comprises inserting a fluid-level gage into the housing, the fluid-level gage being positioned in fluid communication with the collection container.

According to yet another aspect of the present invention, a method of equalizing the amount of pressure in an air-conditioning circuit is provided comprising maintaining a pressure equalization tank in fluid communication with the circuit; retaining fluid heat exchange medium within the pressure equalization tank, the tank having a first end and a second end; equalizing pressure within the tank via a pressure dissipation orifice that remains open; and flowing the fluid between the first end and the second end via a return flow line without fluid entering the pressure dissipation orifice in response to changes in fluid level in the tank.

According to another aspect of the present invention, the method of equalizing the pressure of fluid further comprises restricting fluid flow within the housing through gaps in depressions protruding into the internal volume of the housing.

According to another aspect of the present invention, the method of equalizing the pressure of fluid further comprises discharging fluid from the return flow line into a collection container.

According to another aspect of the present invention, the method of equalizing the pressure of fluid further comprises measuring the fluid-level within the tank with a fluid-level gage, the fluid-level gage comprising a circular receptacle adapted to receive a sensor, and a float surrounding at least a portion of the receptacle, wherein the fluid level gage is in fluid communication with the collection container.

According to yet another aspect of the present invention, a vehicular air-conditioning system is provided comprising a primary circuit, and an air-conditioning device that includes a stationary air-conditioning function. The primary circuit comprises a compressor, a condenser, an evaporator, and a plurality of refrigerant lines providing fluid communication between the compressor, condenser and evaporator.

The stationary air-conditioning device is coupled to the first circuit via the evaporator, and comprises a cold store, a heat exchanger, an equalizing tank, and a plurality of cooling medium lines providing fluid communication between the cold store, heat exchanger, and equalizing tank. The equalizing tank comprises an equalizing tank as described above.

Further objects, features and advantages of the invention will become apparent from the detailed description of preferred embodiments that follows, when considered together with the accompanying figures of drawing.

DETAILED DESCRIPTION OF THE PREFERRED EMBODIMENTS

Figure 1:
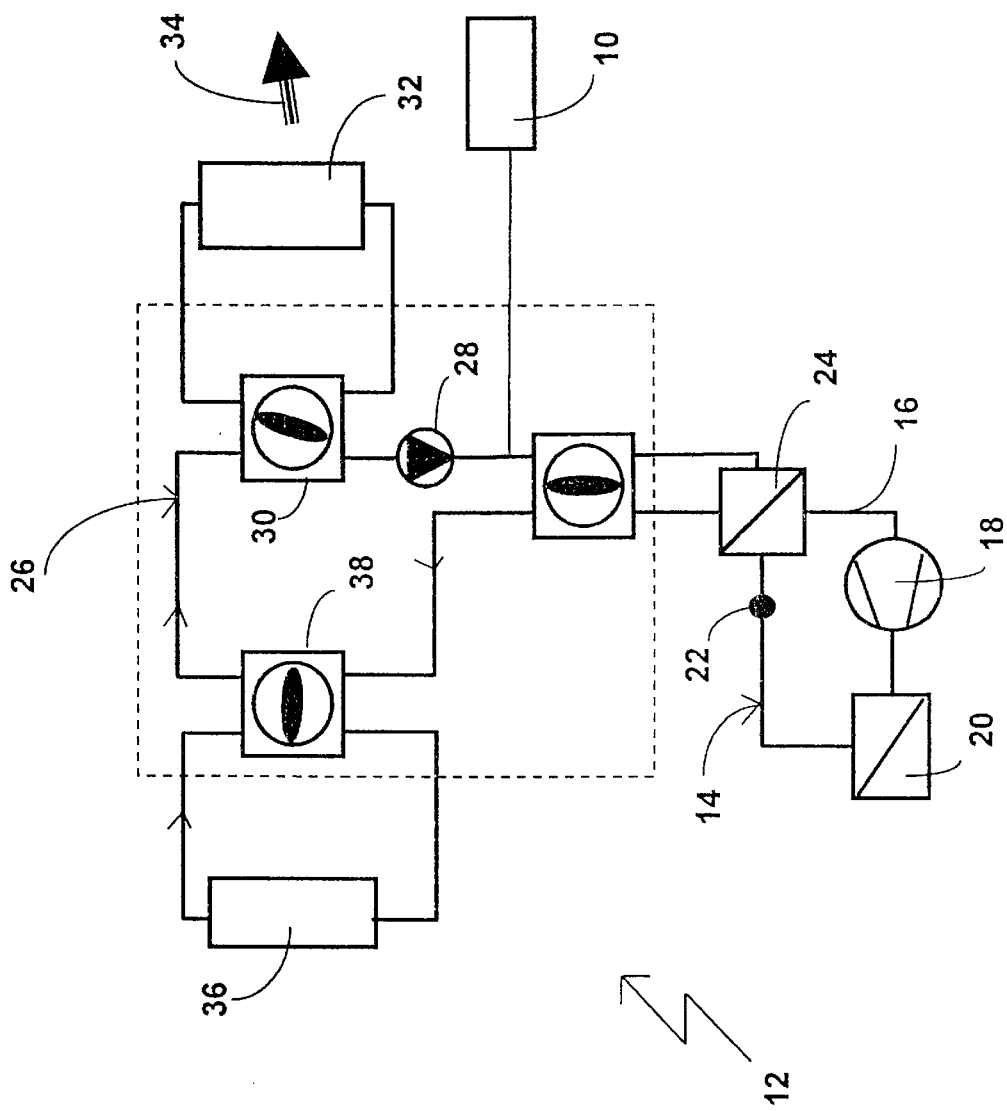
FIG. 1 shows a schematic block diagram of an exemplary air-conditioning system of a motor vehicle having a stationary air-conditioning function according to the present invention.
Figure 2:
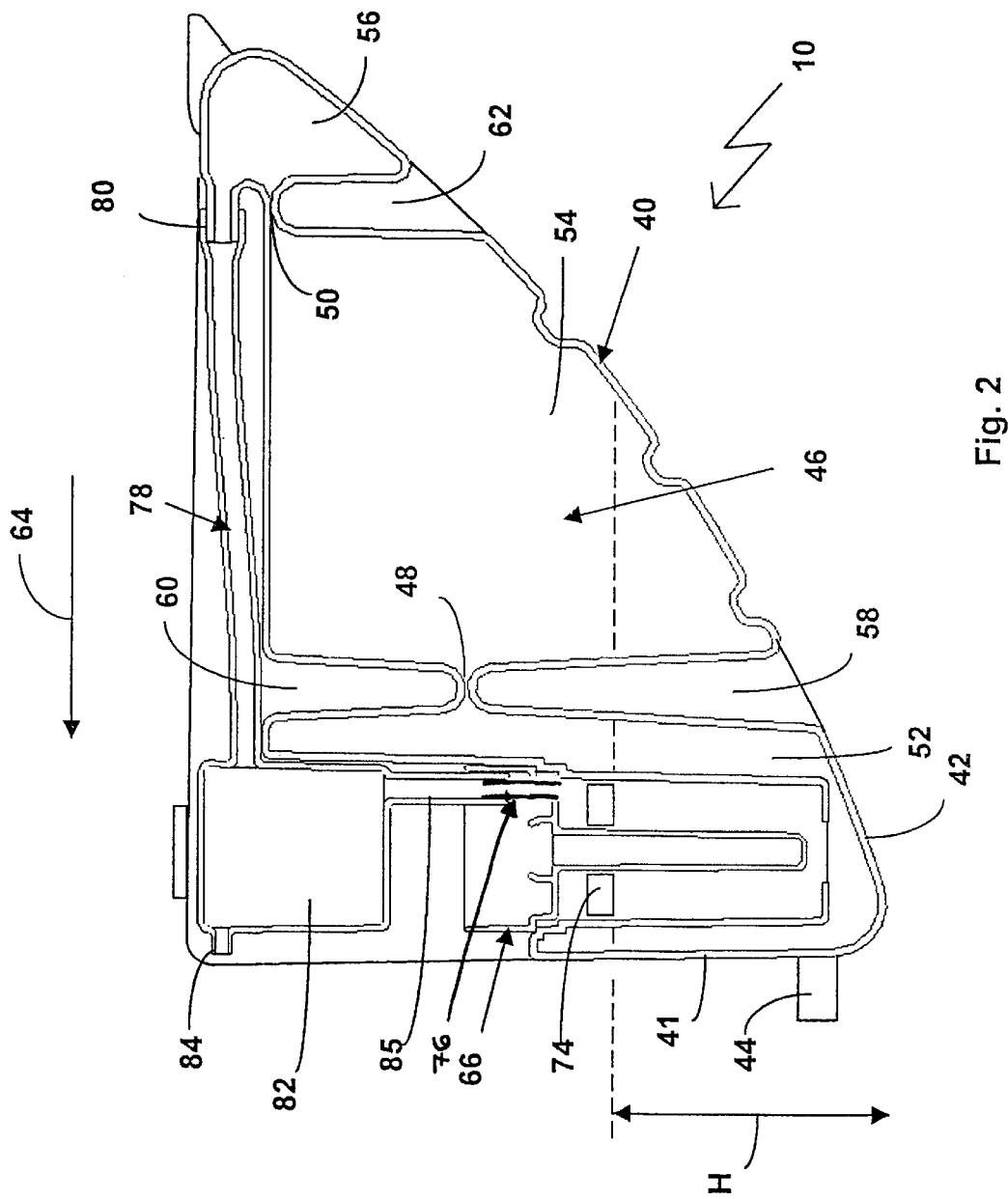
FIG. 2 shows a cross section of an equalizing tank according to an embodiment of the present invention.

Reference will now be made in detail to presently preferred embodiments of the invention. Wherever possible, the same reference numbers will be used throughout the drawings to refer to the same or like parts.

It is an object of the invention to provide an improved equalizing tank which is constructed as simply as possible and is therefore correspondingly cost-effective to manufacture, and which can be used in particular in a cooling-medium circuit of an air-conditioning system of a motor vehicle.

The invention relates to an equalizing tank, in particular, to an equalization tank for a cooling-medium circuit of a motor vehicle air-conditioning system. The equalization tank is provided with pressure-equalizing means for equalizing an excessive and/or negative pressure. In order to provide an improved equalizing tank, which is constructed as simply as possible and is therefore correspondingly cost-effective to manufacture and which can be used in particular in a cooling-medium circuit of an air-conditioning system of a motor vehicle that includes a stationary operating function (i.e., that operates also when the vehicle is stationary and not running), it is proposed that the pressure-equalizing mechanism is formed by an unclosed opening and that a mechanism is provided, by means of which the fluid is prevented from emerging out of the opening. Air-conditioning systems including a stationary operating function preferably comprise an additional circuit, in which, for example, a special cooling medium, that will be used for cooling, is able to be cooled if the primary circuit is stopped.

The equalizing tank according to the invention has pressure-equalizing means which is formed, according to the invention, by an unclosed opening, a mechanism additionally being provided for preventing the fluid from emerging out of the opening. Pressure release valves and/or suction relief valves can thereby be omitted in a cost-effective manner, since any excessive pressure or negative pressure can be equalized through the unclosed opening.

In a structurally simple and cost-effective design of the invention, the mechanism is formed by a return flow line which connects one end of the equalizing tank to the other, so that the fluid within the tank is essentially guided in a circuit during movements of the equalizing tank, the opening being arranged in such a manner that the fluid is guided past the opening, with the result that it cannot emerge through the opening.

In one preferred embodiment of the invention, the return flow line can have at its downstream end a collection container which has the opening advantageously arranged above a point at which the return flow line discharges into the collection container.

For the purpose of simple and cost-effective installation, the return flow line can be designed integrally with the collection container, and/or as a separate insert part.

A fluid-level gage is advantageously arranged in the equalizing tank in order to be able to find out the current fluid level. The fluid-level gage can be equipped with a signal transmitter which emits a corresponding warning signal if the fluid level is too low.

In a cost-effective manner, the equalizing tank can be produced in a blow-molding process, and the fluid-level gage and the return flow lines can be inserted into the molded equalizing tank during installation.

According to the invention, the equalizing tank can be used in a cooling-medium circuit of an air-conditioning system of a motor vehicle having a stationary air-conditioning function.

An equalizing tank 10 according to the invention can be part of an air-conditioning system 12 of a motor vehicle, shown schematically in FIG. 1, which may contain a stationary air-conditioning function. The air-conditioning system 12 has a primary circuit 14, in which a compressor 18, a condenser 20, an expansion element 22 and an evaporator 24 are connected via cooling-agent (refrigerant) lines 16. A secondary circuit 26 is coupled to the primary circuit 14 via the evaporator 24. In the secondary circuit 26, a cooling medium, for example a water/glycerol mixture, is guided in the circuit via a pump 28 and is cooled in the evaporator 24. Coupled to the secondary circuit 26 via a four-way valve 30, is a heat exchanger 32 in which air 34 to be supplied to a vehicle interior can be cooled. Similarly, a cold store 36 can be coupled to the secondary circuit 26 via a four-way valve 38, in order to make stationary air-conditioning possible. Changes in volume of the cooling medium in the secondary circuit 26 and excessive and negative pressures in the secondary circuit 26 are equalized by the equalizing tank 10. An air-conditioning system of this type is disclosed in U.S. Pat. No. 6,112,543, which is incorporated by reference herein in its entirety.

FIGS. 2 to 5 illustrate an exemplary embodiment of the equalizing tank 10 and its components in detail. The equalizing tank 10 has a housing 40 which is preferably produced in a blow-molding process. A connecting stub 44 is arranged in a side wall 41, in the region of a bottom 42 of the housing 40, in order to connect the equalizing tank 10 to the secondary circuit 26. The internal volume 46 in this preferred embodiment is divided virtually into three subvolumes 52, 54 and 56 by depressions 58, 60 and 62 which protrude in the manner of walls into the internal volume 46 and leave a gap in each case only at their side edges and/or ends. Two of the gaps are illustrated with the reference numbers 48 and 50. The gaps between the side walls of the equalizing tank 10 and the side edges of depressions 58, 60, 62 cannot be seen in this illustration. On account of the wall-like depressions 58, 60, 62, the fluid can not slosh to and fro in an unobstructed manner in the interior volume 46 during movements of the equalizing tank 10; rather, it can only pass from one subvolume into another via the gaps. As a result, sloshing noises are substantially avoided.

Figure 5:
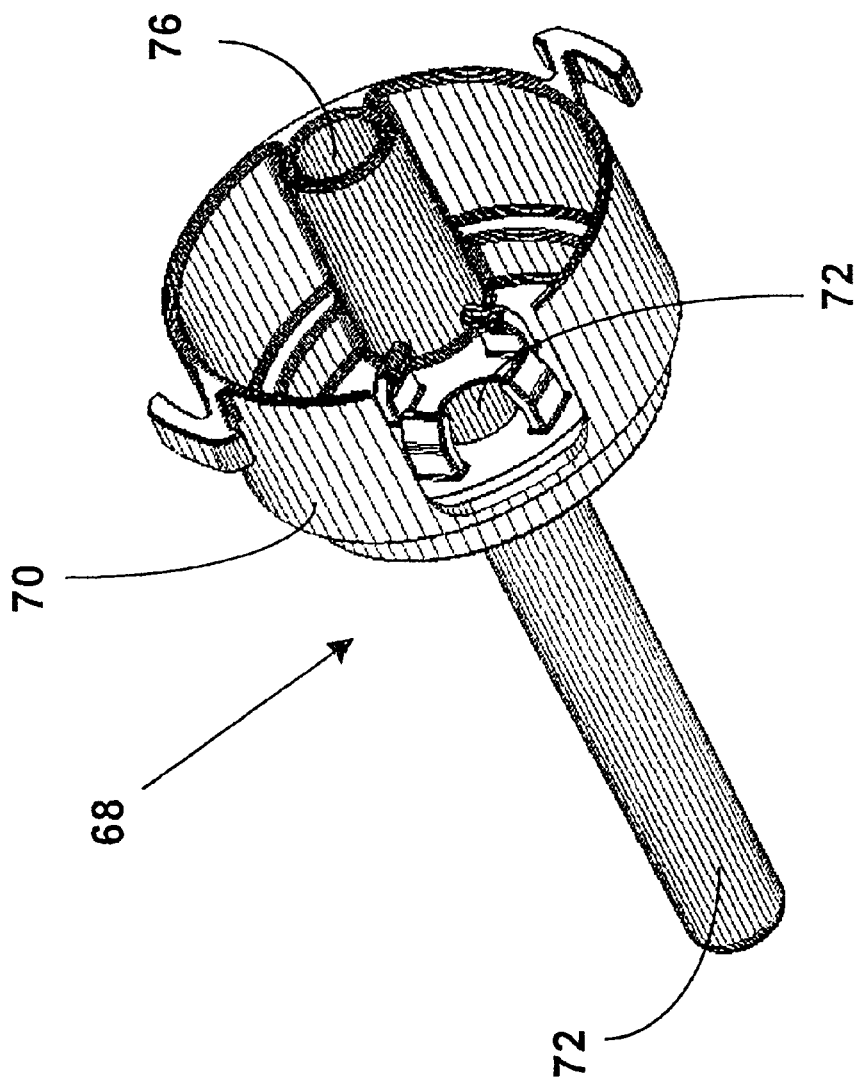
FIG. 5 shows a perspective view of a housing part of a fluid-level gage according to an embodiment of the present invention.

A fluid-level gage 66 is arranged in the subvolume 52 situated in front, as seen in the direction of travel 64. The fluid-level gage 66 has the fluid-level gage housing 68, which is illustrated in FIG. 5, and has a connecting adapter 70, for connecting the fluid-level gage 66 to the equalizing tank 40. Connected to the connecting piece 70 is a cup-like receptacle 72 into which a sensor (not illustrated) can be introduced, with the aid of which the position of a float 74 surrounding the receptacle 72 (FIG. 2) and therefore the fluid height H can be determined. The sensor may, for example, be a reed switch. There is furthermore connected to the connecting piece 70 a connecting stub 76 through which the fluid can flow, as will be explained in greater detail below.

Figure 4:
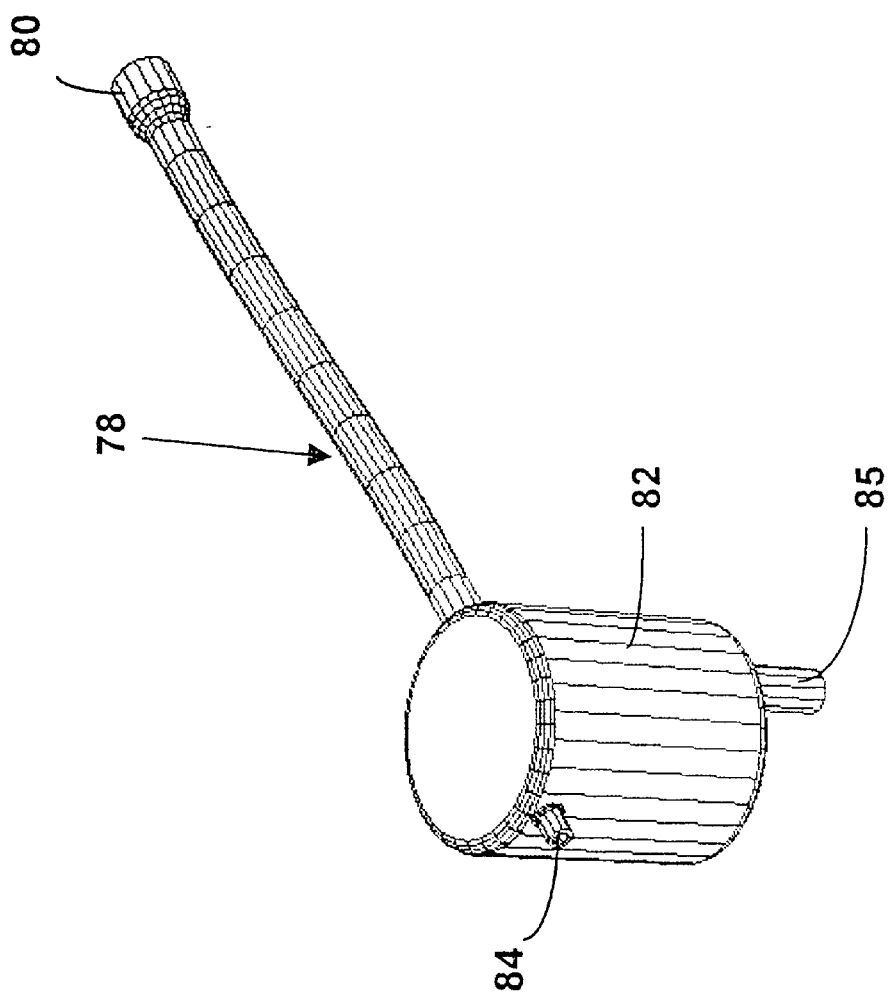
FIG. 4 shows a perspective view of a return flow line having a collecting tank according to an embodiment of the present invention.

The front subvolume 52 is connected to the rear volume 56, as seen in the direction of travel 64, via a return flow line 78. The return flow line 78, which is illustrated in FIG. 4, has, at its end facing the rear subvolume 56, a connection 80 for connection to the rear subvolume 56 and, at its front end, a collecting tank 82 with a connecting line 85 arranged on its bottom, which can be plugged onto the connecting stub 76 of the fluid-level gage 66. In its upper end region, the collecting tank 82 has an unclosed opening 84 which, when the equalizing tank is installed, is situated higher than the point at which the line 78 discharges into the collection container 82.

Figure 3:
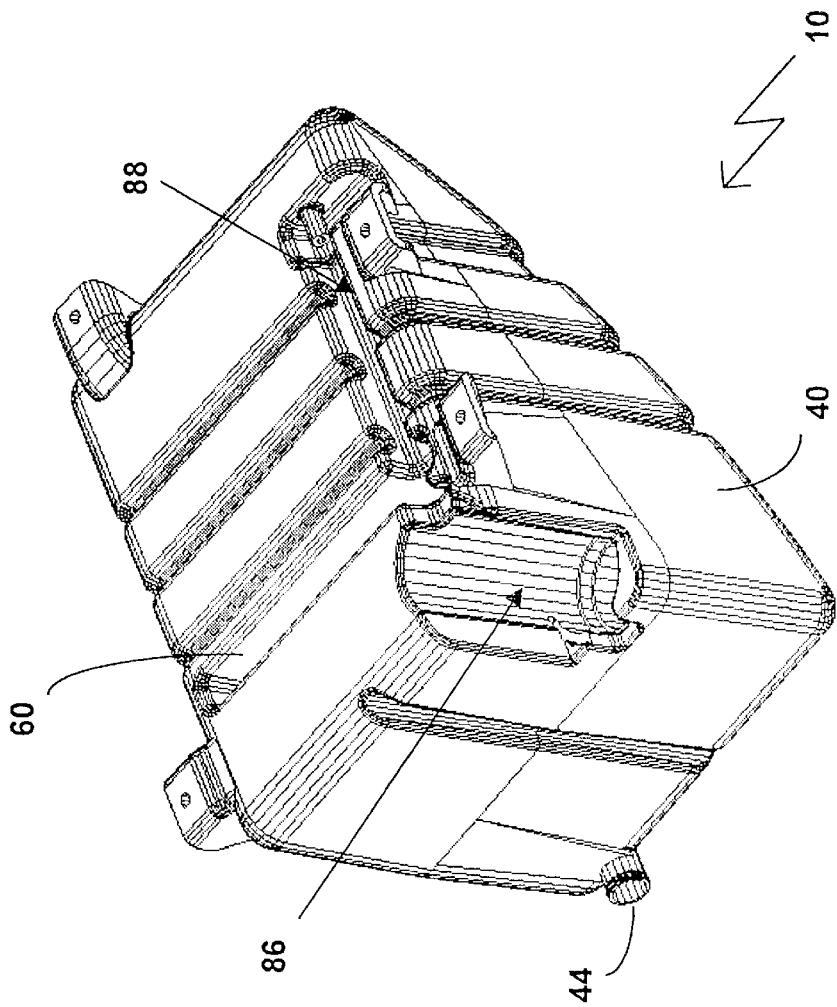
FIG. 3 shows a perspective view of an equalizing-tank housing according to an embodiment of the present invention.

As can be seen from FIG. 3, the fluid-level gage 66 and the collecting tank 82 can be arranged in recess 86, located in a corner region of the equalizing tank 10, the fluid-level gage 66 being inserted first during the installation, and then the return flow line 78 with the collecting tank 82 is inserted and connected. In order to receive the return flow line 78, the tank 10 has a receiving depression 88 on its upper side.

During operation of the air-conditioning system 12 and of the vehicle, the equalizing tank 10 functions as follows.

In the normal state, the equalizing tank 10 is filled approximately as far as the filling height H. Any excessive pressure or negative pressure can be dissipated without any problem via the opening 84. When the vehicle accelerates in the direction of travel 64, the fluid will flow through the gaps past the depressions 58, 60, 62 into the rear subvolume 56, and if the acceleration is very great and long-lasting, the fluid can flow via the return flow line 78 and the collection container 82 and the connecting line 85 back into the first subvolume 52, so that the fluid is, as it were, guided in the circuit via the return flow line 78 without losing fluid. Since the opening 84 is situated higher than the point at which the return flow line 78 discharges into the collecting tank 82, the fluid cannot emerge out of the opening 84. In the case of negative acceleration, i.e., braking of the vehicle, the fluid in the first subvolume 52 could rise. If, in the event of very severe deceleration, the fluid rises to a sufficient extent that the collection container 82 is filled, the fluid is, if appropriate, guided via the return flow line 78 into the rear subvolume 56, in which case the fluid will not emerge out of the opening 84, since this opening is situated higher than the point at which the return flow line 78 discharges into the collecting tank 82.

An equalizing tank is therefore provided which does not have any pressure release valves or suction release valves, and which can nevertheless equalize an excessive pressure or negative pressure and any changes in volume which may arise, for example, from changes in the temperature of the fluid or due to any freezing of the fluid.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined the claims appended hereto and that the claims encompass the disclosed embodiments and their equivalents.

What is claimed is:

1. An equalizing tank suitable for use in an automotive air-conditioning system that includes a fluid cooling-medium circuit, comprising:
   a housing defining a generally closed tank for containing the cooling-medium fluid;
   a pressure compensation mechanism comprising a pressure dissipation orifice that opens into the housing, wherein the orifice remains open; and
   structure associated with the housing that prevents the cooling-medium fluid from entering the pressure dissipation orifice during changes in fluid level within the housing.

2. An equalizing tank according to claim 1, wherein said structure comprises a return flow line configured to provide fluid communication between portions of the internal volume of said housing to provide a fluid flow circuit past the pressure dissipation orifice.

3. An equalizing tank according to claim 2, further comprising a collection container into which said return flow line opens, said collection container containing said pressure dissipation orifice.

4. An equalizing tank according to claim 3, wherein said return flow line is an integral part of said collection container, and wherein the collection container is a separate part from said housing.

5. An equalizing tank according to claim 4, wherein said pressure dissipation orifice is positioned above a point at which said return flow line opens into said collection container.

6. An equalizing tank according to claim 3, further comprising a fluid-level gage.

7. An equalizing tank according to claim 6, wherein said fluid-level gage comprises:
   a circular receptacle adapted to receive a sensor; and
   a float surrounding at least a portion of said receptacle, wherein said fluid level gage is in fluid communication with said collection container.

8. An equalizing tank according to claim 7; wherein said housing is produced in a blow-molding process and includes an opening into which said fluid-level gage is inserted.

9. An equalizing tank according to claim 2, wherein said return flow line is positioned within a receiving depression of said housing.

10. An equalizing tank according to claim 2, wherein said housing includes a first end and a second end, and wherein said return flow line provides fluid communication between said first end and said second end of said housing.

11. An equalizing tank according to claim 1, wherein said housing comprises:
a plurality of wall-like depressions protruding into an internal volume of said housing, said wall-like depressions defining a first, second, and third subvolume within said housing and defining at least one first gap providing fluid communication between said first subvolume and said second subvolume, and at least one second gap providing fluid communication between said second subvolume and said third subvolume.

12. A method of manufacturing an equalizing tank, comprising:
blow-molding a housing, said housing being formed with an opening and a receiving depression;
inserting a collection container into said housing opening, said collection container including a pressure dissipation orifice; and
inserting a return flow line into said receiving depression,
wherein said return flow line provides fluid communication with the collection container and within said housing in a manner such that fluid does not enter said pressure dissipation orifice during changes in fluid level in the housing.

13. The method of manufacturing an equalizing tank according to claim 12, wherein said blow-molding of the housing comprises:
forming a plurality of depressions protruding into an interval volume of said housing, said depressions defining a first, second, and third subvolume within said housing and also defining at least one first gap providing fluid communication between said first subvolume and said second subvolume and at least one second gap providing fluid communication between said second subvolume and said third subvolume.

14. The method of manufacturing an equalizing tank according to claim 12, further comprising inserting a fluid-level gage into said housing opening, said fluid-level gage being positioned in fluid communication with said collection container.

15. The method of manufacturing an equalization tank according to claim 12, wherein said pressure dissipation orifice is positioned above a point at which said return flow line communicates with said collection container.

16. An equalizing tank formed by the method according to claim 12.

17. A method of equalizing the pressure of fluid in a heat exchange circuit containing a fluid medium, comprising:
maintaining a pressure equalization tank in fluid communication with the circuit;
retaining fluid heat exchange medium within the pressure equalization tank, said tank having a first end and a second end;
equalizing pressure within said tank via a pressure dissipation orifice that remains open; and
flowing said fluid between said first end and said second end via a return flow line without fluid entering said pressure dissipation orifice in response to changes in fluid level in the tank.

18. A method of equalizing the pressure of fluid according to claim 17, further comprising restricting fluid flow within said housing through gaps formed by depressions protruding into the internal volume of said tank.

19. A method of equalizing the pressure of fluid according to claim 18, further comprising discharging fluid from said return flow line into a collection container.

20. A method of equalizing the pressure of fluid according to claim 19, wherein said pressure dissipation orifice is positioned above a point at which said return flow line discharges into said collection container.

21. The method of equalizing the pressure of fluid according to claim 20, further comprising measuring the fluid-level within said tank with a fluid-level gage, said fluid-level gage comprising a circular receptacle adapted to receive a sensor and a float surrounding at least a portion of said receptacle, wherein said fluid level gage is in fluid communication with said collection container.

22. A vehicular air-conditioning system, comprising:
a primary circuit comprising:
a compressor;
a condenser;
evaporator; and
plurality of refrigerant lines providing fluid communication between said compressor, condenser and evaporator; and
an air-conditioning device coupled to said first circuit via said evaporator, said air-conditioning device comprising:
a cold store;
a heat exchanger;
an equalizing tank; and
a plurality of cooling medium lines providing fluid communication between said cold store, heat exchanger, and equalizing tank,
wherein said equalizing tank comprises an equalization tank as defined by claim 1.

* * * * *